(12) United States Patent
Barten et al.

(10) Patent No.: US 12,088,072 B2
(45) Date of Patent: Sep. 10, 2024

(54) LINE GUIDING APPARATUS

(71) Applicant: IGUS GMBH, Cologne (DE)

(72) Inventors: Dominik Barten, Meckenheim (DE); Philip Howold, Frechen (DE)

(73) Assignee: IGUS GMBH, Cologne (DE)

( * ) Notice: Subject to any disclaimer, the term of this patent is extended or adjusted under 35 U.S.C. 154(b) by 1009 days.

(21) Appl. No.: 17/042,589

(22) PCT Filed: Mar. 26, 2019

(86) PCT No.: PCT/EP2019/057552
§ 371 (c)(1),
(2) Date: Sep. 28, 2020

(87) PCT Pub. No.: WO2019/185613
PCT Pub. Date: Oct. 3, 2019

(65) Prior Publication Data
US 2021/0021115 A1    Jan. 21, 2021

(30) Foreign Application Priority Data
Mar. 28, 2018   (DE) .................... 20 2018 101 747.0

(51) Int. Cl.
*H02G 11/00*    (2006.01)
*F16G 13/16*    (2006.01)

(52) U.S. Cl.
CPC .......... *H02G 11/006* (2013.01); *F16G 13/16* (2013.01)

(58) Field of Classification Search
CPC .... H02G 11/00; H02G 11/003; H02G 11/006; H02G 11/02; F16G 13/16
See application file for complete search history.

(56) References Cited

U.S. PATENT DOCUMENTS 4,600,817 A * 7/1986 Hackenberg ............ F16L 3/015
                                                     248/51
5,406,327 A * 4/1995 Guarnotta ........ G08B 13/19623
                                                     191/12 R (Continued)

FOREIGN PATENT DOCUMENTS

CN        105643538       6/2016
DE          1783874       5/2007

(Continued)

OTHER PUBLICATIONS

English translation of the International Search Report from corresponding PCT Appln. No. PCT/EP2019/057552, dated May 14, 2019.

(Continued)

*Primary Examiner* — S. Joseph Morano
*Assistant Examiner* — Cheng Lin
(74) *Attorney, Agent, or Firm* — Grossman, Tucker, Perreault & Pfleger, PLLC

(57) ABSTRACT

A line guiding apparatus (1) includes a line guiding unit (2) having a direction-changing region (7) and a support unit (8) which has a slide (9) with a support element (10) arranged thereon for the direction-changing region (7), that at the inside bears against the direction-changing region (7) and permits a movement of the line guiding unit (2) about the centre point axis (17) of the direction-changing region (7). To displace a line guiding unit of high flexibility in a stable linear orientation the support unit (8) has a drive device engaging the slide (9) and driving it in the direction of displacement of the line guiding unit (2) and a control device which is operatively connected to the drive device and is not formed by the line guiding unit (2) itself and with which the drive device is controllable in dependence on the state of movement of a movable connecting region (5).

19 Claims, 2 Drawing Sheets

(56) References Cited

U.S. PATENT DOCUMENTS 9,132,959 B2 *   9/2015   Blase .................. H02G 11/006
9,399,299 B2 *   7/2016   Hermey .................. B25J 19/00

FOREIGN PATENT DOCUMENTS

| DE | 202011004786 | | 9/2011 | |
|----|---|---|---|---|
| DE | 102012023332 | A1 * | 6/2014 | ........... B65H 75/368 |
| DE | 202016106401 | | 12/2017 | |
| DE | 202016106401 | U1 * | 1/2018 | ............. F16G 13/16 |
| FR | 2640599 | | 6/1990 | |
| FR | 2640599 | A1 * | 6/1990 | ............. H02G 11/00 |
| JP | 5039835 | | 12/1975 | |
| JP | S5996813 | | 6/1984 | |
| JP | 63217915 | | 9/1988 | |
| JP | 2005137184 | | 5/2005 | |
| JP | 2016132060 | | 7/2016 | |
| WO | WO-2006108400 | A1 * | 10/2006 | ............ F15B 15/084 |

OTHER PUBLICATIONS

English translation of the International Preliminary Report on Patentability from corresponding PCT Appln. No. PCT/EP2019/057552, dated Sep. 29, 2020.

Office Action from related Taiwanese Appln. No. 108110854, dated Sep. 8, 2022. English translation attached.

Office Action from related Japanese Appln. No. 2020-551530, mailed Jan. 4, 2022. English translation attached.

* cited by examiner

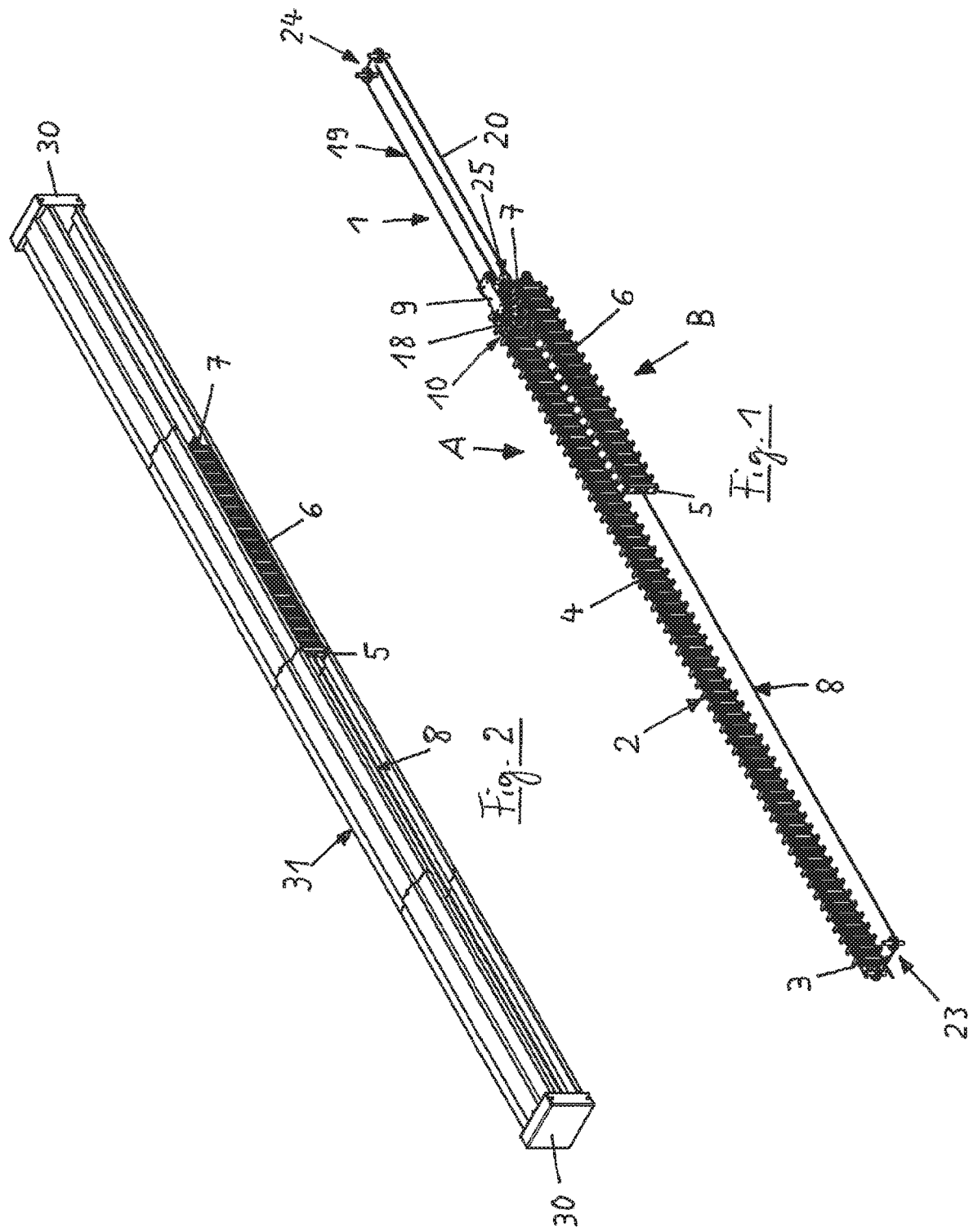

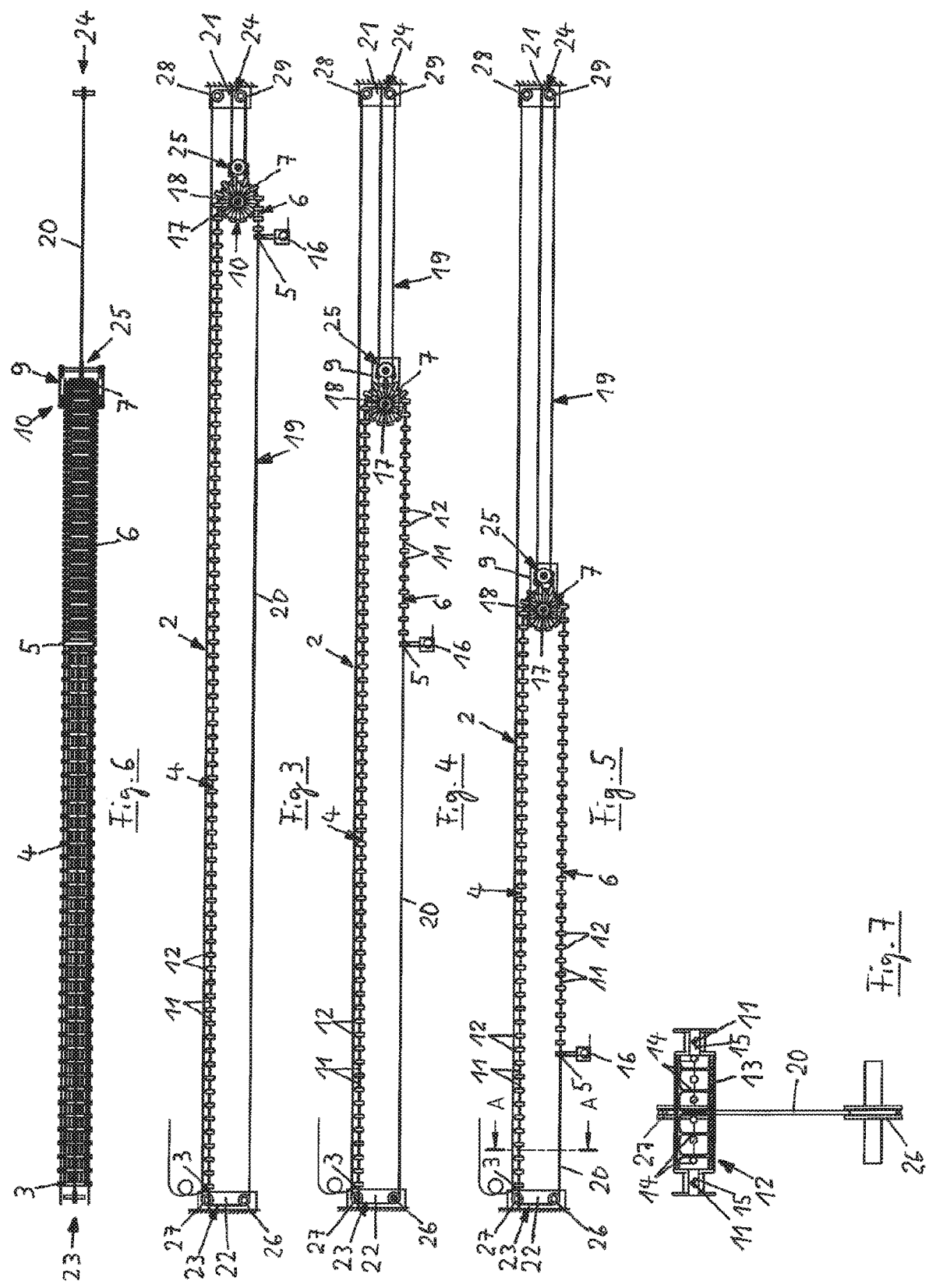

LINE GUIDING APPARATUS

The invention concerns a line guiding apparatus having a line guiding unit which has a first run provided with a fixed connecting region, a second run provided with a movable connecting region and an arcuate direction-changing region connecting the two runs together, and having a support unit which has a slide with a support element arranged on the slide for the direction-changing region of the line guiding unit, that at the inside bears against the direction-changing region and upon displacement of the line guiding unit in the longitudinal direction of the runs permits a movement of the line guiding unit about the central point axis of the arcuate direction-changing region.

A line guiding apparatus of that kind is known from EP 1 783 874 A1. The line guiding unit described in that specification is of a tubular configuration and at its side which faces inwardly in the direction-changing region has a toothed belt co-operating with a gear around which the direction-changing region is guided. Upon displacement of the line guiding unit the gear disposed in the direction-changing region at the inside rolls away and moves with the direction-changing region in both directions of displacement of the line guiding unit. The gear thus supports the direction-changing region of the line guiding unit upon displacement thereof.

In the case of the known line guiding apparatus reliable engagement of the teeth of the toothed belt into the spaces between the teeth of the gear occurs only when the runs can be linearly guided in a stable fashion in their longitudinal extent starting from the direction-changing region which bears against the gear and co-operates therewith by way of the toothed belt. Particularly upon displacement of the movable connecting region in the direction towards the direction-changing region pressure forces act on the second run, which lead to upwardly directed forces above all in the region of the second run, that adjoins the direction-changing region. If the second run is not exactly linearly guided the upwardly directed forces can easily cause the transitional region of the line guiding unit between the second run and the direction-changing region to lift off the gear so that the engagement between the gear and that transitional region and the direction-changing region is interrupted so that the gear is not further entrained with the direction-changing region.

In addition the line guiding apparatus known from EP 1 783 874 is suitable only for line guiding units for receiving and guiding energy and/or information transmission lines, the runs of which automatically extend in a straight line over predetermined distances. It is not suitable in particular for flexible line guiding units comprising members which are pivotable relative to each other in both directions, and for longer displacement travel movements and/or higher travel speeds.

A line guiding apparatus of the kind set forth in the opening part of this specification is also known from DE 20 2011 004 786 U1. That specification discloses a line guiding apparatus having a support unit for a tubular line guiding unit, wherein the support unit has a slide with a direction-changing roller arranged thereon for the direction-changing region of the line guiding unit. The slide with the direction-changing roller is movable against a return force upon displacement of the line guiding unit with its movable connecting region away from its direction-changing region into a deflection position and is movable upon displacement of the line guiding unit with its movable connecting region towards its direction-changing region into a return position by the return force. The force acting on the support unit upon displacement of the line guiding unit with its movable connecting region away from its direction-changing region is produced by a pulling force in respect of the line guiding unit against the return force acting on the slide. Upon displacement of the line guiding unit with its movable connecting region in the direction towards its direction-changing region the movement of the support unit is also caused by the line-guiding unit, wherein the support unit is urged by the return force towards the direction-changing region of the line guiding unit.

By virtue of the pressure and tensile stressing on the line guiding unit upon displacement in both directions the line guiding unit is relatively heavily stressed by the support unit so that this kind of support unit is only suitable for line guiding units which are substantially stable in relation to pressure and tensile stresses, for example energy guiding chains with joint connections that carry corresponding forces.

Therefore the object of the present invention is to provide a line guiding apparatus which even in the case of line guiding units of high flexibility, in particular with members pivotable relative to each other in various directions, and non-linearly guided runs, is displaceable by a support unit in a stable linear orientation of the runs thereof.

According to the invention that object is attained in that the support unit has a drive device which engages the slide and drives it in the direction of displacement of the line guiding unit and a control device which is operatively connected to the drive device and which is not formed by the line guiding unit itself, with which the drive device is controllable in dependence on the state of movement of the movable connecting region.

By virtue of the drive device which engages the slide and drives it in the direction of displacement of the line guiding unit and which is controllable in dependence on the state of movement of the movable connecting region of the line guiding unit, the line guiding unit can be supported in its direction-changing region even upon displacement at high speed and/or over long displacement travel distances, in such a way that the two runs can be held in a stable condition in a straight orientation in relation to outwardly directed forces acting thereon. In particular the line guiding apparatus according to the invention is suitable for line guiding units which have a high level of flexibility, for example comprise members which are pivotable in opposite directions.

The drive and control device provides that, when the movable connecting region of the line guiding unit moves at a speed v, the slide with the support element is displaced at the speed v/2. The drive device engaging the slide exerts a pulling force on the slide and the support element, without the interposition of further drive elements, when the movable connecting region of the line guiding unit is displaced in the direction towards the direction-changing region and same moves with the second run of the line guiding unit. By virtue of the provision of the drive device the slide and the support element can also move with the direction-changing region of the line guiding unit, without a pressure stressing or an only very low pressure stressing being exerted on the direction-changing region.

If the movable connecting region of the line guiding unit is displaced in the direction away from the direction-changing region then the support unit can be entrained by the direction-changing region of the line guiding unit, that acts against it, and in that case can be controlled by the control device in such a way that the stable rectilinear orientation of the runs is retained.

According to the present invention it is only a movement of the support unit in the direction of displacement of the line guiding unit, but not the line guiding unit itself, that is driven by the drive device engaging the slide of the support unit. At least the inwardly facing side of the arcuate direction-changing region of the line guiding unit can bear against the support unit during the displacement of the line guiding unit over the entire travel distance in both directions.

The support element can be mounted rotatably to the slide.

Preferably the support element is in the form of a direction-changing roller around which the direction-changing region of the line guiding unit is arranged and is rotatable with the direction-changing roller.

The control device and the drive device can be of such a nature that the support element exerts a prestressing on the line guiding unit so that, at a fast displacement speed and over long displacement travel distances of the line-guiding unit, the runs remain oriented straight in any position of the support element.

The slide of the support unit can be positively guided by suitable means.

In particular the slide can be guided in a guide rail.

The slide can have guide means which co-operate with guide means of a housing for linear guidance of the line guiding unit, in which the line guiding unit and the support unit are arranged.

The support unit can have a sensor device, by way of which the position of the movable connecting region of the line guiding unit or an entrainment means connected thereto can be detected and which is connected in signal relationship with the control device.

In general the drive device and the control device can form a mechatronic system.

The signal device can be connected in signal relationship to the drive device.

The control device can be connected in signal relationship to a control unit for an entrainment means connected to the movable connecting region of the line guiding unit or is integrated into the control unit for the entrainment means.

In a further configuration the control device and the drive device can be formed by a mechanical operative connection between the movable connecting region of the line guiding unit or an entrainment means which can be connected thereto and the slide of the support unit. The mechanical operative connection in this case has both a control function and also a drive function, by which the support element can be driven in controlled relationship in dependence on the state of movement of the movable connecting region. The mechanical operative connection is of such a configuration that, when the movable connecting region of the line guiding unit moves at a speed v, the slide is displaced with the support element at the speed v/2.

The mechanical operative connection can have a belt or cable pull means of which one end is connected to the movable connecting region or can be connected to an entrainment means which can be connected thereto and of which the other end can be connected to a first stationary fixing region which in an end position of the direction-changing region of the line guiding unit is arranged with a minimal length of the second run outside the support unit, wherein the belt or cable pull means extends from the movable connecting region of the line guiding unit or an entrainment means which can be connected thereto in a prolongation of the second run to a second stationary fixing region which is arranged outside the end position of the movable connecting region or an entrainment means which can be connected thereto at the maximum length of the second run, is changed in direction at same by a first direction-changing unit and is guided back to the first stationary fixing region, is changed in direction at same by a second direction-changing unit and is guided to the slide of the support unit where it is guided around a third direction-changing unit arranged at the slide to the first stationary fixing region.

The first direction-changing unit can include a first roller and a second roller, wherein the first roller changes the direction of the belt or cable pull means in a prolongation of the second run in a direction towards the first run relative to the second roller and the second roller changes the direction of the belt or cable pull means at the outside of the first run in the direction towards the first stationary fixing region. The second direction-changing unit includes a third roller and a fourth roller, wherein the second roller changes the direction of the belt or cable pull means guided from the second roller in a direction towards the second run relative to the fourth roller and the fourth roller guides the belt or cable pull means in a direction towards the third direction-changing unit arranged at the slide.

The third direction-changing unit can be in the form of a direction-changing roller mounted rotatably to the slide.

The direction-changing roller arranged at the slide and the first to fourth rollers for changing the direction of the belt or cable pull means can be arranged in the plane extending through the centre of the two runs. The entire belt or cable pull means is thus arranged in the plane extending through the centre of the two runs.

The first and the second stationary fixing region can be arranged in end regions of a housing accommodating the line guiding and support unit.

An embodiment of the present invention is described in greater detail hereinafter with reference to the drawing in which:

FIG. 1 shows a perspective view of the line guiding apparatus,

FIG. 2 shows the arrangement of the line guiding apparatus shown in FIG. 1 in a housing, FIG. 3 shows a view in the direction of the arrow A on to the line guiding apparatus shown in FIG. 1 at the position of maximum extension of the line guiding unit, FIG. 4 shows a view in the direction of the arrow A on to the line guiding apparatus shown in FIG. 1 at a first retracted position of the line guiding unit, FIG. 5 shows a view in the direction of the arrow A on to the line guiding apparatus shown in FIG. 1 at a second retracted position of the line guiding unit, FIG. 6 shows a view in the direction of the arrow B on to the line guiding apparatus shown in FIG. 1, and FIG. 7 shows a section along line C-C in FIG. 3.

As can be seen in particular from FIG. 1 the line guiding apparatus 1 includes a line guiding unit 2 which includes a first run 4 provided with a fixed connecting region 3, a second run 6 provided with a movable connecting region 5, and an arcuate direction-changing region 7 connecting the two runs 4 and 6 together, as well as a support unit 8 having a slide 9 with a support element 10 arranged on the slide 9.

The line guiding unit 2 is in the form of an energy guiding chain which has at both sides a respective tensioning cable 11 with frames 12 fixed thereto at equal spacings. The tensioning cables 11 are flexible so that the energy guiding chain can bend in the direction-changing region 7 thereof. The frames 12 which serve as link members of the energy guiding chain are suitable for receiving energy lines and/or information transmission lines and guiding them therein.

That structure of the line guiding unit 2 can be seen more clearly from the cross-section shown in FIG. 7 through a frame 12. The frame 12 has a rectangular frame body 13, through which energy lines and/or information transmission lines can be guided. The interior of the frame body 13 is divided by dividing webs 14 into portions which serve to receive lines that are to be arranged separately and that can be of different kinds. Formed laterally on the frame body 13 are engagement elements 15, the structural purpose of which is described hereinafter.

The movable connecting region 5 of the line guiding unit 2 is connected to an entrainment means 16, by which the lines emerging from the movable connecting region 5 of the line guiding unit 2 are fed to a machine unit (not shown) connected to the entrainment means. The lines in question pass into the line guiding unit 2 in the fixed connecting region 3.

The support unit 8 has a support element 10 mounted rotatably on the slide 9, adjoining two direction-changing pulley discs 18 mounted on a spindle 17. The support element 10 bears at the inside against the direction-changing region 7 of the line guiding unit 2 and, upon displacement of the line guiding unit 2 in the longitudinal direction of the runs 4 and 6, permits a movement of the line guiding unit 2 about the centre point axis of the arcuate direction-changing region 7, the centre point axis corresponding to the spindle 7 of the arcuate direction-changing region 18.

The direction-changing discs 18 mounted rotatably with their spindle 17 at both sides of the slide 9 have at their periphery recesses into which the engagement elements 15 of the frames 12 of the line guiding unit 2 engage in the direction-changing region 7 thereof. In that case the tensioning cables 11 which are guided by the engagement elements 15 are not contacted by the direction-changing discs 18.

The support unit 8 of the line guiding apparatus 1 has a drive and control device which is in the form of a mechanical operative connection 19 between the entrainment means 16 of the line guiding unit 8, that is connected to the movable connecting region 5, and the slide 9 with the support element 10 arranged thereon. The mechanical operative connection 19 has a cable pull means 20 of which one end is connected to the movable connecting region 5 and of which the other end can be connected to a first stationary fixing region 21 arranged in an end position of the direction-changing region 7 of the line guiding unit 2 with minimal length of the second run 6 outside the support unit 8. The cable pull means 20 extends from the movable connecting region 5 of the line guiding unit 2 as a prolongation of the second run 6 to a second stationary fixing region 22 which is arranged outside the end position of the movable connecting region 5 at the maximum length of the second run 6. The direction of the cable pull means is changed thereat by a first direction-changing unit 23 and the cable pull means is guided back to the first stationary fixing region 21. The direction of the cable pull means 20 is changed thereat by a second direction-changing unit 24 and the cable pull means is guided to the slide 9 of the support unit 8 where it is guided around a third direction-changing unit 25 arranged at the slide 9 to the first stationary fixing region 21.

The first direction-changing unit 23 has a first roller 26 and a second roller 27, wherein the first roller 26 is deflected in the direction towards the first run 4 relative to the second roller 27. At same the cable pull means 20 is deflected in a direction towards the first stationary fixing region 21 and is guided at the outside of the first run 4.

The second direction-changing unit 24 has a third roller 28 and a fourth roller 29, wherein the third roller 28 changes the direction of the cable pull means 20 guided from the second roller 27, in a direction towards the second run 6 relative to the fourth roller 29. The fourth roller 29 guides the cable pull means 20 in the direction towards the third direction-changing unit 25 arranged at the slide 9. The third direction-changing unit 25 is in the form of a direction-changing roller mounted rotatably at the slide 9.

The mechanical operative connection 19 has thus both a control function and also a drive function and, in the embodiment described here and illustrated in the drawing, forms the control and drive device of the support unit 8, by which the support element 10 can be controlledly driven in dependence on the state of movement of the movable connecting region 5.

The third direction-changing unit 25 which is arranged on the slide and which is in the form of a direction-changing roller as well as the first to fourth rollers 26-29, by way of which the cable pull means 20 is changed in direction at the first and second fixing regions 21, 22 respectively, as can be seen from FIGS. 6 and 7, is disposed in the plane passing through the centre of the two runs 4 and 6. The entire cable pull means 20 is thus arranged in the plane of the centre of gravity extending through the centre of the two runs 4 and 6 so that the support unit 8 co-operates with the line guiding unit 2 compensating for forces in that plane.

As can be seen from FIG. 2 the first and second fixing regions 21 and 22 are arranged at end plates 30 of a housing 31 in which the slide 9 of the line guiding unit 2 is guided.

LIST OF REFERENCES 1 line guiding apparatus
2 line guiding unit
3 fixed connecting region
4 first run
5 movable connecting region
6 second run
7 direction-changing region
8 support unit
9 slide
10 support element
11 tensioning cable
12 frame
13 frame body
14 dividing web
15 engagement elements
16 entrainment means
17 spindle
18 direction-changing disc
19 operative connection
20 cable pull means
21 first fixing region
22 second fixing region
23 first direction-changing unit
24 second direction-changing unit
25 third direction-changing unit
26 first roller
27 second roller
28 third roller
29 fourth roller
30 plate
31 housing

The invention claimed is:

1. A line guiding apparatus comprising:
   a line guiding unit having a first run provided with a fixed connecting region, a second run provided with a movable connecting region and an arcuate direction-changing region connecting the first run and the second run together, and having a support unit which has a slide with a support element arranged on the slide for the direction-changing region of the line guiding unit, that at an inside of the support element bears against the direction-changing region and, upon displacement of the line guiding unit in a longitudinal direction of the first run and the second run, permits a movement of the line guiding unit about a central point axis of the direction-changing region,
   wherein the support unit has a drive device which engages the slide and drives the slide in a direction of displacement of the line guiding unit and a control device which is operatively connected to the drive device and which is not formed by the line guiding unit itself, with which the drive device is controllable in dependence on a state of movement of the movable connecting region, and
   wherein it is only a movement of the support unit in the direction of displacement of the line guiding unit, but not the line guiding unit itself, that is driven by the drive device engaging the slide of the support unit.

2. The line guiding apparatus according to claim 1, wherein the support element is mounted rotatably to the slide.

3. The line guiding apparatus according to claim 2, wherein the support element comprises a direction-changing roller around which the direction-changing region of the line guiding unit is arranged and is rotatable with the direction-changing roller.

4. The line guiding apparatus according to claim 1, wherein the control device and the drive device provide a configuration such that the support element exerts a pre-stressing on the line guiding unit.

5. The line guiding apparatus according to claim 1, wherein the slide is guided by a guide device.

6. The line guiding apparatus according to claim 1, wherein the slide has guide means which cooperate with guide means of a housing for linear guidance of the line guiding unit, wherein the line guiding unit and the support unit are arranged in the housing.

7. The line guiding apparatus according to claim 1, wherein the support unit has a sensor device, by which a position of the movable connecting region of the line guiding unit, or an entrainment means connected thereto, is detectable and which is connected in signal relationship with the control device.

8. The line guiding apparatus according to claim 1, wherein the drive device and the control device form a mechatronic system.

9. The line guiding apparatus according to claim 1, wherein the control device is connected in signal relationship to the drive device.

10. The line guiding apparatus according to claim 1, wherein the control device is connected in signal relationship to a control unit for an entrainment means connected to the movable connecting region of the line guiding unit.

11. The line guiding apparatus according to claim 1, wherein the control device is integrated into a control unit for an entrainment means.

12. The line guiding apparatus according to claim 1, wherein the control and drive device is formed by a mechanical operative connection between the movable connecting region of the line guiding unit, or an entrainment means connectable thereto, and the slide of the support unit.

13. The line guiding apparatus according to claim 12, wherein the mechanical operative connection has a belt or a cable pull means of which one end is connected to the movable connecting region, or is connectable to an entrainment means which is connectable thereto, and of which another end is connectable to a first stationary fixing region, which in an end position of the direction-changing region of the line guiding unit, is arranged with a minimal length of the second run outside the support unit, wherein the belt or the cable pull means extends from the movable connecting region of the line guiding unit, or the entrainment means which is connectable thereto, in a prolongation of the second run to a second stationary fixing region which is arranged outside the end position of the movable connecting region, or the entrainment means which is connectable thereto, at a maximum length of the second run, the belt or cable pull means is changed in direction at same by a first direction-changing unit and is guided back to the first stationary fixing region, the belt or cable pull means is changed in direction at same by a second direction-changing unit and is guided to the slide of the support unit where it is guided around a third direction-changing unit arranged at the slide to the first stationary fixing region.

14. The line guiding apparatus according to claim 13, wherein the first and second fixing regions are arranged in end regions of a housing accommodating the line guiding unit and the support unit.

15. A line guiding apparatus comprising:
   a line guiding unit having a first run provided with a fixed connecting region, a second run provided with a movable connecting region and an arcuate direction-changing region connecting the first run and the second run together, and having a support unit which has a slide with a support element arranged on the slide for the direction-changing region of the line guiding unit, that at an inside of the support element bears against the direction-changing region and, upon displacement of the line guiding unit in a longitudinal direction of the first run and the second run, permits a movement of the line guiding unit about a central point axis of the direction-changing region,
   wherein the support unit has a drive device which engages the slide and drives the slide in a direction of displacement of the line guiding unit and a control device which is operatively connected to the drive device and which is not formed by the line guiding unit itself, with which the drive device is controllable in dependence on a state of movement of the movable connecting region,
   wherein it is only a movement of the support unit in the direction of displacement of the line guiding unit, but not the line guiding unit itself, that is driven by the drive device engaging the slide of the support unit,
   wherein the first direction-changing unit includes a first roller and a second roller, wherein the first roller changes the direction of the belt or the cable pull means in a prolongation of the second run in a direction towards the first run relative to the second roller and the second roller changes the direction of the belt or the cable pull means at the outside of the first run in the direction towards the first stationary fixing region and the second direction-changing unit includes a third roller and a fourth roller, wherein the third roller changes the direction of the belt or the cable pull means guided from the second roller in a direction towards the second run relative to the fourth roller and the fourth roller guides the belt or the cable pull means in a direction towards the third direction-changing unit arranged at the slide.

16. The line guiding apparatus according to claim 15, wherein the third direction-changing unit is in a form of a direction-changing roller mounted rotatably to the slide.

17. The line guiding apparatus according to claim 16 wherein the direction-changing roller arranged at the slide and the first to fourth rollers for changing the direction of the belt or the cable pull means are arranged in a plane extending through the center of the first run and the second run.

18. The line guiding apparatus according to claim 15, wherein the slide is guided by a guide device.

19. The line guiding apparatus according to claim 15, wherein the slide has guide means which cooperate with guide means of a housing for linear guidance of the line guiding unit, wherein the line guiding unit and the support unit are arranged in the housing.

\* \* \* \* \*